(12) United States Patent
Bleifuss et al.

(10) Patent No.: US 8,535,602 B2
(45) Date of Patent: Sep. 17, 2013

(54) SYSTEM AND METHOD FOR PRODUCING METALLIC IRON

(75) Inventors: Rodney L. Bleifuss, Grand Rapids, MN (US); David J. Englund, Bovey, MN (US); Iwao Iwasaki, Tokyo (JP); Donald R. Fosnacht, Hermantown, MN (US); Mark M. Brandon, Charlotte, NC (US); Bradford G. True, Charlotte, NC (US)

(73) Assignee: Nu-Iron Technology, LLC, Charlotte, NC (US)

( * ) Notice: Subject to any disclaimer, the term of this patent is extended or adjusted under 35 U.S.C. 154(b) by 0 days.

(21) Appl. No.: 13/351,742

(22) Filed: Jan. 17, 2012

(65) Prior Publication Data
US 2012/0119424 A1    May 17, 2012

Related U.S. Application Data

(60) Division of application No. 12/418,037, filed on Apr. 3, 2009, now Pat. No. 8,097,065, and a continuation-in-part of application No. PCT/US2007/080364, filed on Oct. 4, 2007, and a continuation-in-part of application No. PCT/US2007/080362, filed on Oct. 4, 2007.

(60) Provisional application No. 60/828,171, filed on Oct. 4, 2006, provisional application No. 60/828,170, filed on Oct. 4, 2006, provisional application No. 61/042,063, filed on Apr. 3, 2008.

(51) Int. Cl.
*C22B 13/10* (2006.01)

(52) U.S. Cl.
USPC ............ 266/178; 266/183; 266/186; 432/195

(58) Field of Classification Search
USPC ........................ 266/178, 183, 186; 432/195
See application file for complete search history.

(56) References Cited

U.S. PATENT DOCUMENTS

| | | |
|---|---|---|
| 4,378,241 A | 3/1983 | Baker et al. |
| 5,350,295 A | 9/1994 | Kenji |

(Continued)

FOREIGN PATENT DOCUMENTS

| | | |
|---|---|---|
| DE | 3215209 | 11/1983 |
| EP | 1357195 | 10/2003 |

(Continued)

OTHER PUBLICATIONS

Machine Translation of FR 1,557,112 A, filed Dec. 21, 1967.*

*Primary Examiner* — George Wyszomierski
*Assistant Examiner* — Tima M McGuthry Banks
(74) *Attorney, Agent, or Firm* — Hahn, Loeser & Parks LLP; Arland T. Stein

(57) ABSTRACT

A hearth furnace for producing metallic iron material has a furnace housing having a drying/preheat zone, a conversion zone, a fusion zone, and optionally a cooling zone, the conversion zone is between the drying/preheat zone and the fusion zone. A moving hearth is positioned within the furnace housing. A hood or separation barrier within at least a portion of the conversion zone, fusion zone or both separates the fusion zone into an upper region and a lower region with the lower region adjacent the hearth and the upper region adjacent the lower region and spaced from the hearth. An injector introduces a gaseous reductant into the lower region adjacent the hearth. A combustion region may be formed above the hood or separation barrier.

36 Claims, 12 Drawing Sheets

(56) References Cited

U.S. PATENT DOCUMENTS

| | | |
|---|---|---|
| 5,730,775 A | 3/1998 | Meissner et al. |
| 5,885,521 A | 3/1999 | Meissner et al. |
| 6,126,718 A | 10/2000 | Sawa et al. |
| 6,129,777 A | 10/2000 | Fuji et al. |
| 6,135,766 A | 10/2000 | Takeda |
| 6,152,983 A | 11/2000 | Kamijo et al. |
| 6,214,087 B1 | 4/2001 | Hoffman et al. |
| 6,257,879 B1 | 7/2001 | Lu |
| 6,264,721 B1 | 7/2001 | Takeda et al. |
| 6,270,552 B1 | 8/2001 | Takeda et al. |
| 6,390,810 B1 | 5/2002 | Rinker et al. |
| 6,413,295 B2 | 7/2002 | Meissner et al. |
| 6,521,171 B2 | 2/2003 | Tateishi |
| 6,592,646 B2 | 7/2003 | Shigehisa et al. |
| 6,648,942 B2 | 11/2003 | Hoffman |
| 6,685,761 B1 | 2/2004 | Hoffman |
| 7,413,592 B2 | 8/2008 | Bleifuss et al. |
| 7,695,544 B2 | 4/2010 | Iwasaki et al. |
| 7,875,236 B2 | 1/2011 | Bleifuss et al. |
| 2002/0178864 A1 | 12/2002 | Wantanabe et al. |
| 2004/0154436 A1 | 8/2004 | Ito |
| 2004/0173054 A1 | 9/2004 | Tsuge et al. |
| 2006/0150774 A1 | 7/2006 | Iwasaki et al. |
| 2006/0169103 A1 | 8/2006 | Ito |
| 2009/0175753 A1 | 7/2009 | Iwasaki et al. |
| 2010/0031776 A1 | 2/2010 | Englund et al. |

FOREIGN PATENT DOCUMENTS

| | | |
|---|---|---|
| FR | 1557112 | 2/1969 |
| JP | 2006-328489 | 7/2006 |
| WO | 01-09394 | 2/2001 |
| WO | 03-064708 A1 | 8/2003 |
| WO | 2004-083463 | 9/2004 |
| WO | 2006/061787 A | 6/2006 |
| WO | 2006/061788 A | 6/2006 |
| WO | 2006/061790 A | 6/2006 |
| WO | 2008-042997 A1 | 4/2008 |

* cited by examiner

SYSTEM AND METHOD FOR PRODUCING METALLIC IRON

This application is a divisional application of U.S. patent application Ser. No. 12/418,037, filed on Apr. 3, 2009, and issued as U.S. Pat. No. 8,097,065,
and U.S. patent application Ser. No. 12/418,037, filed on Apr. 3, 2009, is a continuation in part application and claims the benefit of international application PCT/US2007/080364, filed Oct. 4, 2007, which claims the benefit of U.S. Provisional Application 60/828,171, filed Oct. 4, 2006;
and also U.S. patent application Ser. No. 12/418,037, filed on Apr. 3, 2009, is a continuation in part application of and claims the benefit of international application PCT/US2007/080362, filed Oct. 4, 2007, which claims the benefit of United Sates Provisional Application 60/828,170, filed Oct. 4, 2006;
and also U.S. patent application Ser. No. 12/418,037, filed on Apr. 3, 2009, claims the benefit of U.S. Provisional Application 61/042,063, filed on Apr. 3, 2008; the disclosures of each of which are incorporated herein by reference.

This invention was made with government support from Sponsor Award DE-FG36-05GO15185 awarded by the Department of Energy. The United States government has certain rights in the invention.

BACKGROUND AND SUMMARY OF THE DISCLOSURE

This invention relates generally to a system and method for producing metallic iron by thermally reducing a metal oxide in a moving hearth furnace.

Metallic iron has been produced by reducing iron oxide such as iron ores, iron pellets and other iron sources. Various such methods have been proposed so far for directly producing metallic iron from iron ores or iron oxide pellets by using reducing agents such as coal or other carbonaceous material.

These processes have been carried out in rotary hearth and linear hearth furnaces. An example of such a rotary hearth furnace is described in U.S. Pat. No. 3,443,931. An example of such a linear hearth furnace is described in U.S. Pat. No. 7,413,592. Both the rotary hearth furnace and the linear hearth furnace involve making mixtures of carbonaceous material with iron ore or other iron oxide fines into balls, briquettes or other compacts, and heating them on a moving hearth furnace to reduce the iron oxide to metallic iron nuggets and slag.

Hearth furnaces are largely operated with combustion gases from the heating burners flowing counter to the movement of the hearth and the charge materials. Thermal energy is transferred to the charge materials by direct radiation from the burner flame and the furnace walls as well as by direct contact of the combustion gases with the charge materials. The open nature of these systems, even if divided into zones by baffle walls, does not allow much control of the furnace atmosphere, which is predominantly burner combustion products with lesser amounts of reaction products from the charge materials.

Hearth furnaces are generally heated by natural gas burners that provide thermal energy to the system to raise the temperature of the charge materials and initiate the reduction process, that is, the reaction of the carbon in the charge materials with the iron oxides in the charge materials. The carbon dioxide in the combustion gases also reacts with the carbon in the charge materials to produce carbon monoxide through the Boudouard reaction at about 1830° F. (1000° C.). This reaction removes carbon from the charge materials at relatively low temperatures. At these temperatures the reaction rate between the carbon monoxide formed and the iron oxide is relatively slow. Therefore, carbon is leached from the system before the reduction process can be completed and has a negative effect on the process.

The effect is that final reduction, in the case of forming iron nuggets, relies on production of carbon monoxide through interaction of the combustion gases with the carbon in the charge materials, which requires high temperatures approaching or exceeding 2550° F. (1400° C.). This high temperature requires both extra burner energy and time to allow completion of the reduction process. These higher temperatures also increase construction and maintenance costs because more costly refractory is required. A further impediment is the removal of carbon from the charge materials before metallization is complete so that the carbon is not available to be absorbed by the metallic iron formed reducing its melting temperature.

An additional limitation of these furnaces, and the methods of operating these furnaces, in the past has been their energy efficiency. Furthermore, the reduction process involved production of volatiles in the furnace that had to removed from the furnace and secondarily combusted to avoid an environmental hazard, which added to the energy needs to perform the iron reduction. See, e.g., U.S. Pat. No. 6,390,810. What has been needed is a furnace that reduces the energy consumption needed to reduce the iron oxide bearing material such that a large part, if not all, of the energy to heat the iron oxide bearing material to the temperature necessary to cause the iron oxide to be reduced to metallic iron and slag comes from combusting volatiles directly in the furnace itself and otherwise using heat generated in one part of the furnace in another part of the furnace.

A hearth furnace for producing metallic iron material is disclosed that comprises:

(a) a furnace housing having a drying/preheat zone capable of providing a drying/preheat atmosphere for reducible material, a conversion zone capable of providing a reducing atmosphere for reducible material, a fusion zone capable of providing an atmosphere to at least partially reduce metallic iron material, and optionally a cooling zone capable of providing a cooling atmosphere for reduced material containing metallic iron material, the conversion zone being positioned between the drying/preheat zone and the fusion zone, (b) a hearth capable of being movable within the furnace housing in a direction through the drying/preheat zone, then the conversion zone, then the fusion zone, and then, if present, the cooling zone, (c) a hood or separation barrier positioned within at least a portion of the conversion zone, fusion zone or both, separating the conversion and fusion zones where the hood or separation barrier is positioned into an upper region and a lower region with the lower region adjacent the hearth and the upper region adjacent the lower region and spaced from the hearth, and (d) at least one reductant injector capable of introducing a gaseous reductant into the lower region adjacent the hearth.

Alternatively, the hood or separation barrier may be positioned within at least a portion of the conversion zone, the fusion zone or both, separating the furnace housing where the hood or separation barrier is located into a combustion region and a reducing region with the reducing region adjacent the hearth and the combustion region adjacent the reducing region and spaced from the hearth. In some alternatives, the separation barrier may act as a hood.

In addition, a method of reducing iron ore and other iron oxide sources is disclosed comprising:

(a) providing a furnace housing having a drying/preheat zone capable of providing a drying/preheat atmosphere for reducible material, a conversion zone capable of providing a reducing atmosphere for reducible material, a fusion zone capable of providing an atmosphere to at least partially reduce metallic iron material, and a cooling zone capable of providing a cooling atmosphere for reduced material containing metallic iron material, the conversion zone being positioned between the drying/preheat zone and the fusion zone, (b) providing a hearth capable of being movable within the furnace housing in a direction through the drying/preheat zone, then the conversion zone, then the fusion zone, and then the cooling zone, (c) positioning a hood or separation barrier within at least a portion of the conversion zone, fusion zone or both separating the atmosphere of the conversion and fusion zones where the hood or separation barrier is positioned into an upper region and a lower region, with the lower region adjacent the hearth and the upper region adjacent the lower region and spaced from the hearth, (d) injecting a gaseous reductant into the lower region adjacent the hearth, and (e) moving the hearth containing iron oxide bearing material and carbonaceous material in the furnace housing through the drying/preheat zone to dry and preheat the iron oxide bearing material and carbonaceous material, then through the conversion zone to heat the iron oxide bearing material and carbonaceous material to at least partially reduce the iron oxide bearing material, then through the lower region of the fusion zone in the presence of the injected gaseous reductant to fuse the reduced iron oxide bearing material to metallic iron material, and then through the cooling zone to cool the metallic iron material.

The gaseous reductant may be selected from the group comprising carbon monoxide, hydrogen, natural gas, syngas, or mixtures thereof.

DETAILED DESCRIPTION OF THE DRAWINGS

Figure 1:
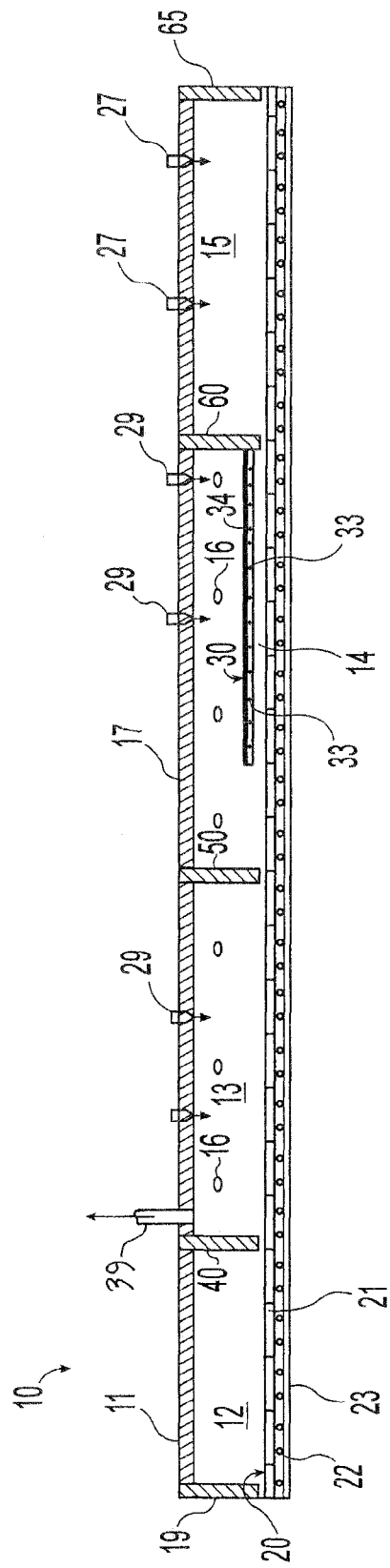
FIG. 1 is an elevation view illustrating a hearth furnace for producing metallic iron material and a method for producing same.

Referring to FIG. 1, a hearth furnace 10 for producing metallic iron material directly from iron ore and other iron oxide sources is shown. The furnace 10 has a furnace housing 11 internally lined with a refractory material suitable to withstand the temperatures involved in the metallic reduction process carried out in the furnace. The hearth furnace 10 is divided into a drying/preheat zone 12 capable of providing a drying/preheat atmosphere for reducible material, a conversion zone 13 capable of providing a reducing atmosphere for reducible material, a fusion zone 14 capable of providing an atmosphere to at least partially form metallic iron material, and optionally a cooling zone 15 capable of providing a cooling atmosphere for reduced material containing metallic iron material. The conversion zone 13 is positioned between the drying/preheat zone 12 and the fusion zone 14. The conversion zone 13 is the zone in which at least the initial reduction of metallic iron material occurs. The entry end of the hearth furnace 10, at the drying/preheat zone 12, is closed by a restricting baffle 19 that inhibits fluid flow between the outside ambient atmosphere and the atmosphere of the drying/preheat zone 12, yet provides clearance so as not to inhibit the movement of reducible material into the furnace housing 11. The baffle 19 may be made of suitable refractory material or a metal material if the temperatures are sufficiently low. The exit end of the hearth furnace 10, at the cooling zone 15, may be closed by a restricting baffle 65 that inhibits fluid flow between the outside ambient atmosphere and the atmosphere of the cooling zone 15, yet provides clearance so as not to inhibit the movement of reducible material out of the furnace housing 11. The baffle 65 may be made of a suitable refractory material or a metal material if the temperatures are sufficiently low.

Hearth 20 provided within the furnace housing 11 may comprise a series of movable hearth cars 21, which are positioned contiguously end to end as they move through the furnace housing 11. Hearth cars 21 are moved on wheels 22 which typically engage railroad rails 23. The upper portion of the hearth cars 21 are lined with a refractory material suitable to withstand the temperatures for reduction of the iron oxide bearing material into metallic iron as explained herein. The hearth cars are positioned contiguously end to end to move through the furnace housing 11, so that the lower portions of the hearth cars are not damaged by the heat generated in the furnace as the process of reducing iron oxide-bearing material into metallic iron proceeds. Alternatively, the hearth 20 may be movement belt or other suitable conveyance medium that with the refractory material described below, is able to within the temperatures of the furnace atmospheres as described below.

The reducible material is positioned on the hearth cars 21 outside the furnace generally in the form of a mixture of finely divided iron ore, or other iron oxide bearing material, and a carbonaceous material, such as coke, char, anthracite coal or non-caking bituminous and sub-bituminous coal. The reducible material is in mixtures of finely divided iron oxide-bearing material that are formed into compacts. The compacts may be briquettes or mounds preformed or formed in situ on the hearth cars 21 so that the mixtures of reducible material are presented to the furnace 10 in discrete portions. Also, a hearth layer of finely divided carbonaceous material, such as coke, char or coal, may be provided on the hearth cars with the reducible material positioned on the hearth layer, to avoid damage to the refractory material used in the upper portion of the hearth cars 21 from the related slag generated on reducing the metallic iron in the furnace.

The hearth furnace may be linear as generally illustrated in FIG. 1. In this connection, the building in which the furnace is housed, or other considerations, may require that certain parts of the furnace be arcuate or at angles, to accommodate these needs. For these purposes, the hearth furnace is classified as linear if a part of its length, usually the conversion zone 13, is substantially linear in the direction of travel of the hearth 20. The hearth furnace may also be a rotary hearth furnace, in which case the hearth cars are pie-shaped or in the form of replaceable sections of a contiguous hearth.

The zones of the furnace 10 are generally characterized by the temperature reached in each zone. In the drying/preheat zone 12, moisture is generally driven off from the reducible material and the reducible material is heated to a temperature short of fluidizing volatiles in and associated with the reducible material positioned on the hearth cars 21. The design is to reach in the drying/preheat zone a cut-off temperature in the reducible material just short of significant volatilization of carbonaceous material in and associated with the reducible material. This temperature is generally somewhere in the range of about 300-600° F. (150-315° C.), depending in part on the particular composition of the reducible material.

The conversion zone 13 is characterized by heating the reducible material to initiate the reduction process in forming the reducible material into metallic iron material and slag. The conversion zone 13 is generally characterized by heating the reducible material to about 1500 to 2100° F. (815 to 1150° C.), depending on the particular composition and form of reducible material.

The fusion zone 14 involves further heating the reducible material, now absent of most volatile materials and commencing to form metallic iron, to fuse the metallic iron material and separate slag. The fusion zone generally involves heating the reducible material to about 2400 to 2550° F. (1315-1370° C.), or higher, so that metallic iron nuggets are formed with only a low percentage of iron oxide in the metallic iron. If the process is carried out efficiently, there will also be a low percentage of iron oxide in the slag, since the process is designed to reduce very high percentage of the iron oxide in the reducible material to metallic iron.

Figure 1C:
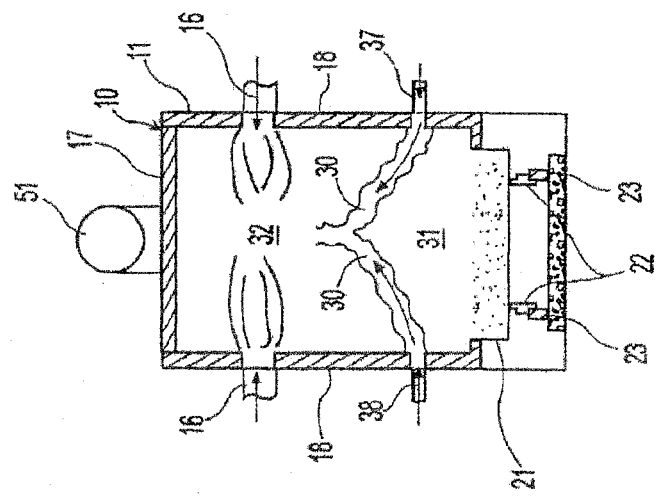
FIG. 1C is a cross-sectional view taken along line 1-1 of FIG. 2, illustrating a second alternative embodiment of a hearth furnace shown in FIG. 1.
Figure 1B:
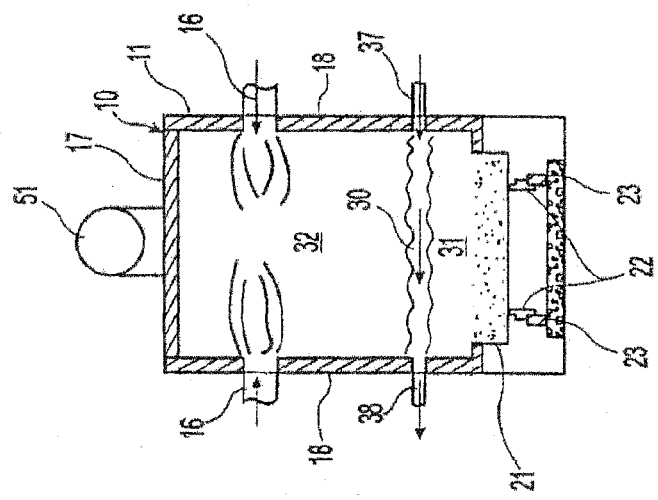
FIG. 1B is a cross-sectional view taken along line 1-1 of FIG. 2, illustrating a second alternative embodiment of a hearth furnace shown in FIG. 1.
Figure 1A:
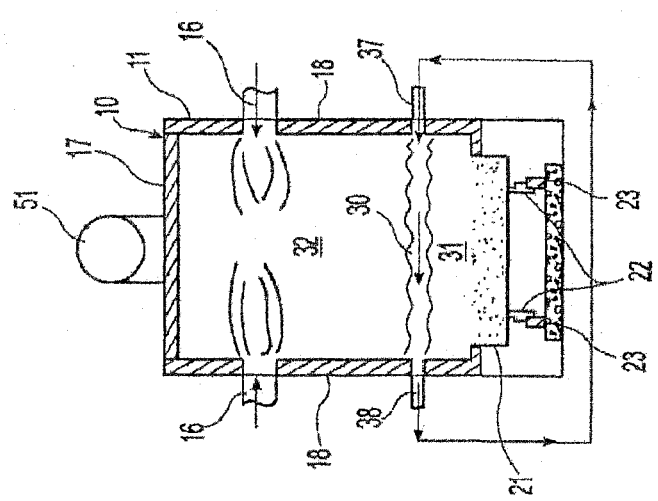
FIG. 1A is a cross-sectional view taken along line 1-1 of FIG. 2, illustrating an alternative embodiment of the hearth furnace shown in FIG. 1.
Figure 2:
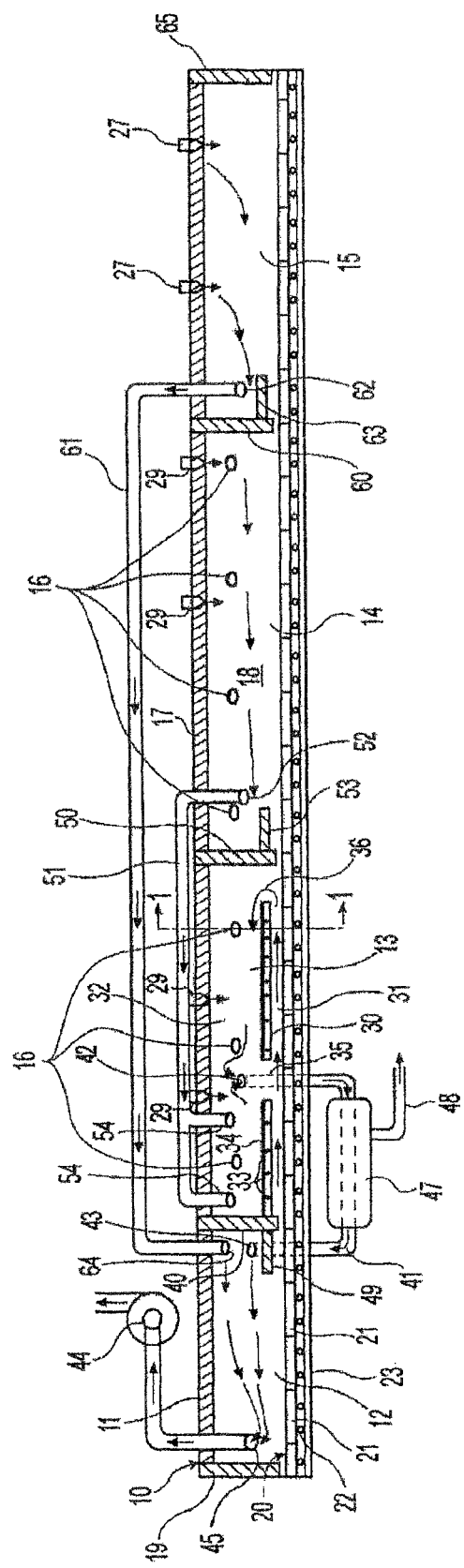
FIG. 2 is an elevation view illustrating an alternative embodiment of a hearth furnace for producing metallic iron material, and method of operation of the same.

The heating of the reducible material in the conversion zone 13 and fusion zone 14 may be done by oxy-fuel burners 16 in the side wall 18 of the furnace housing 11 as shown in FIGS. 1, 1A, 1B and 1C. The oxy-fuel burners 16 are positioned to provide for efficient combustion of the volatilized materials in the conversion zone (as described in detail below) and to efficiently reduce the reducible material to metallic iron material in fusion zone 14. The oxy-fuel burners 16 should be positioned to provide for efficient heat transfer and efficient reduction of the iron oxide in the reducible material with the least energy consumption. The oxy-fuel burners 16 may be positioned on about 10 foot centers (about 3 m), staggered along opposite side walls 18, about a foot down from the roof 17 of the furnace housing 11. Alternatively, or in addition, the oxy-fuel burners 16 may be positioned opposite each other in the side walls 18 (as shown in FIGS. 1A, 1B and 1C) and/or in the roof 17 of the furnace housing 11. In addition, oxygen lances 29 may be positioned in the roof 17 of the furnace housing 11 of the conversion zone 13 and the fusion zone 14 to provide additional energy for generation of heat and efficient conversion of the reducible material in the furnace. Combustion gases are exhausted via an exhaust conduit 39. FIG. 1 shows an exemplary placement of exhaust conduit 39. Depending on desired operating conditions, exhaust conduit 39 may be placed elsewhere in conversion zone 13, may be placed in fusion zone 14, or may be placed in drying/preheat zone 12 as shown in FIG. 2. There may be a single exhaust conduit 39, or there may be multiple exhaust conduits placed in diverse locations within furnace 10.

Cooling zone 15 cools the metallic iron material from its formation temperature in the conversion zone 13 and fusion zone 14 to a temperature at which the metallic iron material can be reasonably handled and further processed. This temperature is generally about 500° F. (260° C.) or below. The cooling can be achieved by injection of nitrogen through nozzles 27 in the roofs and/or side walls of the furnace housing 11 and/or indirect water cooling. Also, water spray may be used for the cooling in the cooling zone 15, if desired and provision made for water handling within the system.

Figure 6:
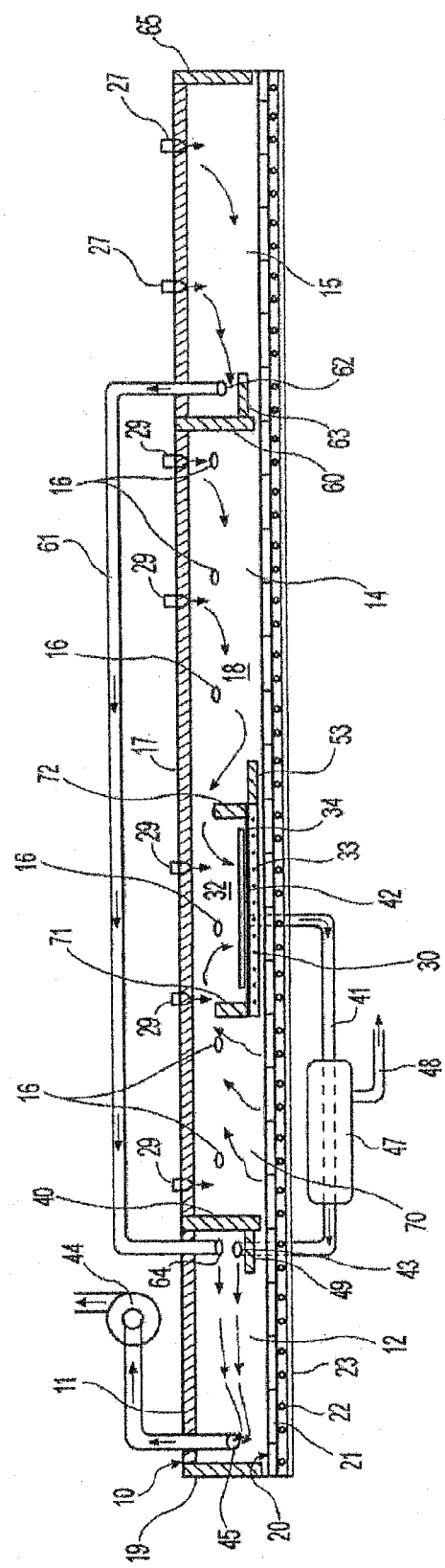
FIG. 6 is an elevation view illustrating a further alternative embodiment of a hearth furnace for producing metallic iron material, and method for operation for the same.
Figure 7:
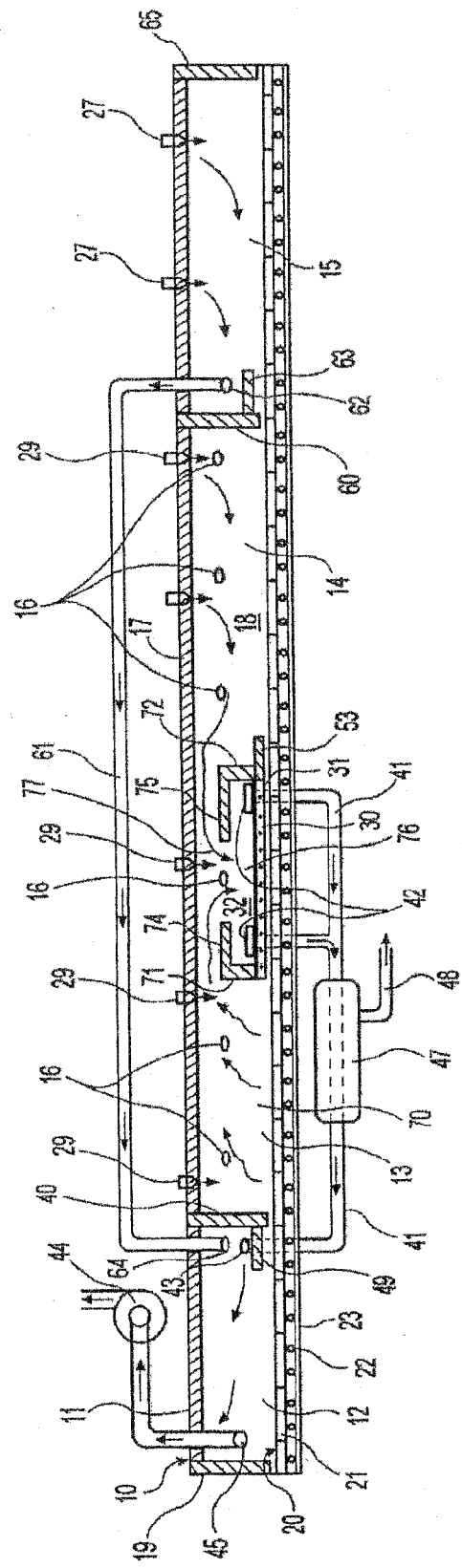
FIG. 7 is an elevation view illustrating a further alternative embodiment of a hearth furnace for producing metallic iron material, and method for operation for the same.
Figure 8:
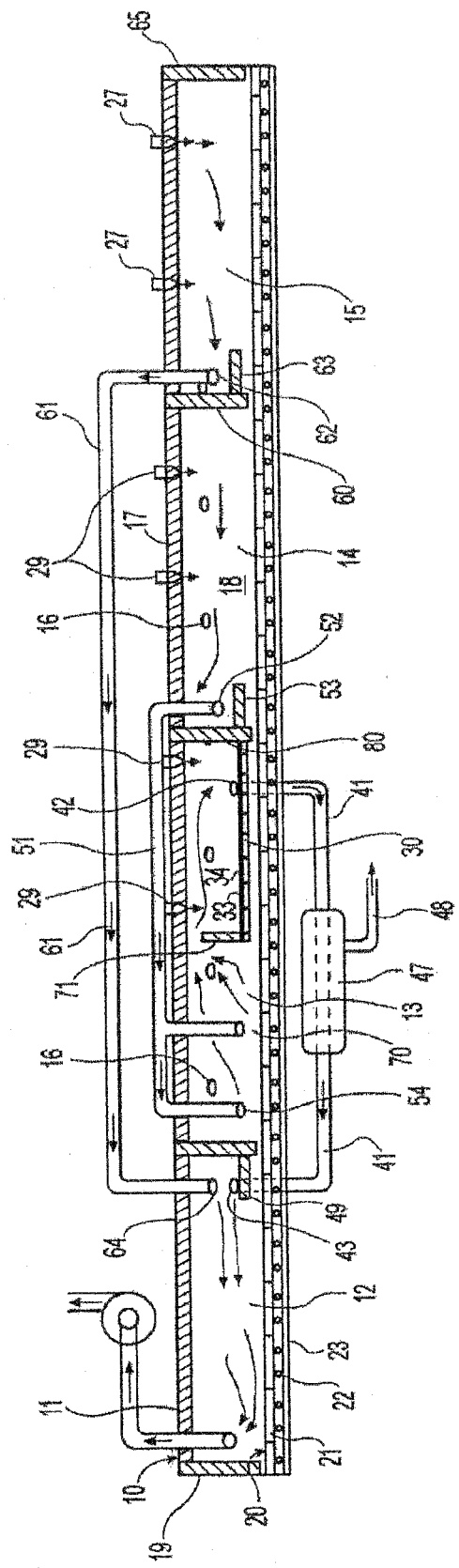
FIG. 8 is an elevation view illustrating a further alternative embodiment of a hearth furnace for producing metallic iron material, and method for operation for the same.

Shown in FIG. 1, a hood or separation barrier 30 is positioned in the fusion zone 14, separating the fusion zone into a lower region or reducing region 31 adjacent the hearth 20 and upper region or combustion region 32 adjacent the reducing region 31 and spaced from the hearth 20. As shown, for example, in FIGS. 2 and 9, the separation barrier 30 may be positioned in the conversion zone 13 separating the conversion zone into a lower region or reducing region 31 adjacent the hearth 20 and upper region or combustion region 32 adjacent the reducing region 31 and spaced from the hearth 20. In yet another alternate, the separation barrier 30 may be positioned within at least a portion of the conversion zone, the fusion zone or both, the separation upper region, or combustion region and a lower region, or reducing region with the reducing region adjacent the hearth and the combustion region adjacent the reducing region and spaced from the hearth. As shown in FIGS. 6 through 8, the separation barrier 30 may be positioned in a portion of both the conversion zone and the fusion zone. Additionally, while the figures show the separation barrier 30 positioned as shown, the separation barrier 30 of each of these alternatives may be positioned in the at least a portion of the conversion zone, the fusion zone or both.

In one embodiment, the separation barrier 30 may comprise spaced pipes or hollow beams 33, positioned transverse between the furnace side walls as shown in FIG. 1. The spaced pipes or hollow beams 33 may have a square cross section, a rectangular cross section or a round cross section. The beams 33 may abut one another or be spaced from another. The spacing may be sufficient to accommodate growth from thermal changes, or it may be, for example, 2 feet on center (about 0.6 m). A plate or grate 34 may be provided on top of the beams 33. The plate or grate 34 may be made of a ceramic, silicon carbide, refractory or another suitable material. In the separation barrier 30, there may also be provided intermediately along its length and at its end gaps 35 and 36, respectively, such as shown in FIG. 2. The gaps are typically positioned to facilitate flow of the fluidized volatile material from the reducible material in the reducing region 31 to the combustion region 32 of the conversion zone 13, for efficient combustion of the volatiles to produce heat that can be transferred to the reducing region 31 and reducible material in the reducing region 31 of the conversion zone 13. To provide for this flow from the reducing region 31 to the combustion region 32, a flow is created through the atmosphere of the reducing region 31 in the direction of travel of the moving hearth 20, and in a part of the combustion region 32 in a direction counter to the direction of movement of the hearth through the furnace housing 11.

The separation barrier 30 may be of a heat conductive material capable of conducting the heat generated in the combustion region 32 above the separation barrier to the reducing region 31 below the separation barrier to reduce the reducible material positioned on the hearth 20, or heat radiating material capable of absorbing heat from the combustion of the fluidized volatile material in the combustion region 32 above the separation barrier and radiating heat into the reducing region 31 below the separation barrier to reduce the reducible material, or both. The separation barrier 30 may be made of silicon carbide or other such higher heat conductive refractory material.

Alternatively, or in addition to gaps 35, the separation barrier 30 may be perforated, as with a grate for example, or otherwise discontinuous to allow for controlled flow of fluidized material from the region below the separation barrier into the region above the separation barrier.

Alternatively, or in addition to gaps 35, the separation barrier 30 may be a gas curtain as shown in FIG. 1A or 1B. As shown in FIGS. 1A and 1B, the gas curtain forming the separation barrier 30 is a gas flow from one side wall of the furnace housing 11 (at 37) to the opposite side wall of the furnace housing 11 (at 38) in a transverse direction to movement of the hearth 20 through the furnace housing 11. The gas curtain forming the separation barrier may be either a closed system as shown in FIG. 1A, where the gas is continually re-circulated with gas supplements, or a single pass through system as shown in FIG. 1B where the gas enters through the side wall 18 of the furnace housing 11 at 37 and exits through the opposite side wall 18 of the furnace housing 11 at 38.

In another embodiment, the separation barrier 30 may be formed by a gas curtain simultaneously flowing from opposite side wall 18 of the furnace housing 11 at 37 and 38, but angled upwardly to flow transverse the direction of travel of the hearth 20 through the furnace housing 11. In this embodiment, the separation barrier 30 may be formed by the flow from oxy-fuel burners positioned in the side walls 18 of the furnace housing 11 at 37 and 38. Oxy-fuel burners (not shown) may be positioned at 37 and 38 a few inches above the reducible material on the hearth 20 as shown in FIGS. 1A, 1B and 1C. The gas curtain forming the separation barrier 30 may comprise a gas selected from the group consisting of nitrogen, carbon monoxide, combustion gas, effluent gas from the furnace or a mixture of two or more of these gases.

Figure 3:
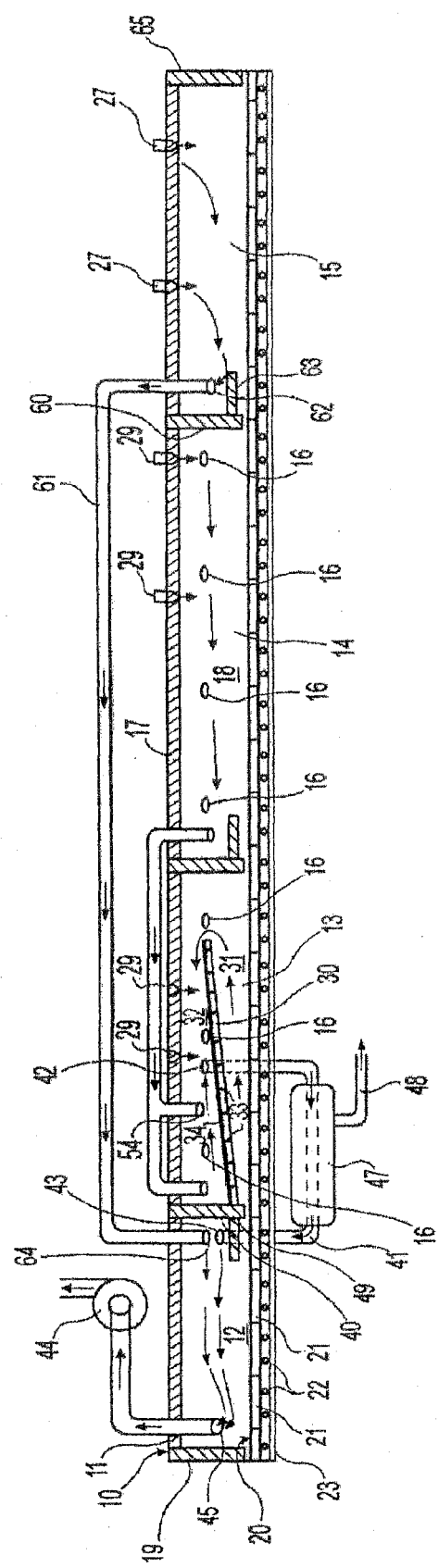
FIG. 3 is an elevation view illustrating a further alternative embodiment of a hearth furnace for producing metallic iron material, and method for operation of the same.

Alternatively, or in addition to gaps 35 and 36, the separation barrier may be perforated, as with a grate for example, or otherwise discontinuous to allow for efficient flow of fluidized volatile material from the reducing region 31 into the combustion region 32 of the conversion zone 13. To provide for efficient flow of the volatile material fluidized in the reducing region 31 into the combustion region 32 of the conversion zone 13, the separation barrier 30 may also ascend upwardly in the direction of movement of the hearth 20 through the furnace 10. Such an ascending separation barrier may be as shown in FIG. 3 where the separation barrier is angled. Alternatively, the separation barrier 30 may be provided in ascending steps (not shown) to facilitate construction of an ascending separation barrier 30 in sections along the furnace housing 11. In any case, the separation barrier is ascending to allow for increased volume of fluidized volatile material in the reducing region 31 as the temperature increased in the reducible material with the hearth 20 moving the reducible material through the conversion zone 13 of the furnace.

The separation barrier 30 impedes direct impingement of combustion gases with the reducible material on the hearth 20 and impedes reaction of furnace combustion gases with the reducible material.

Figure 1D:
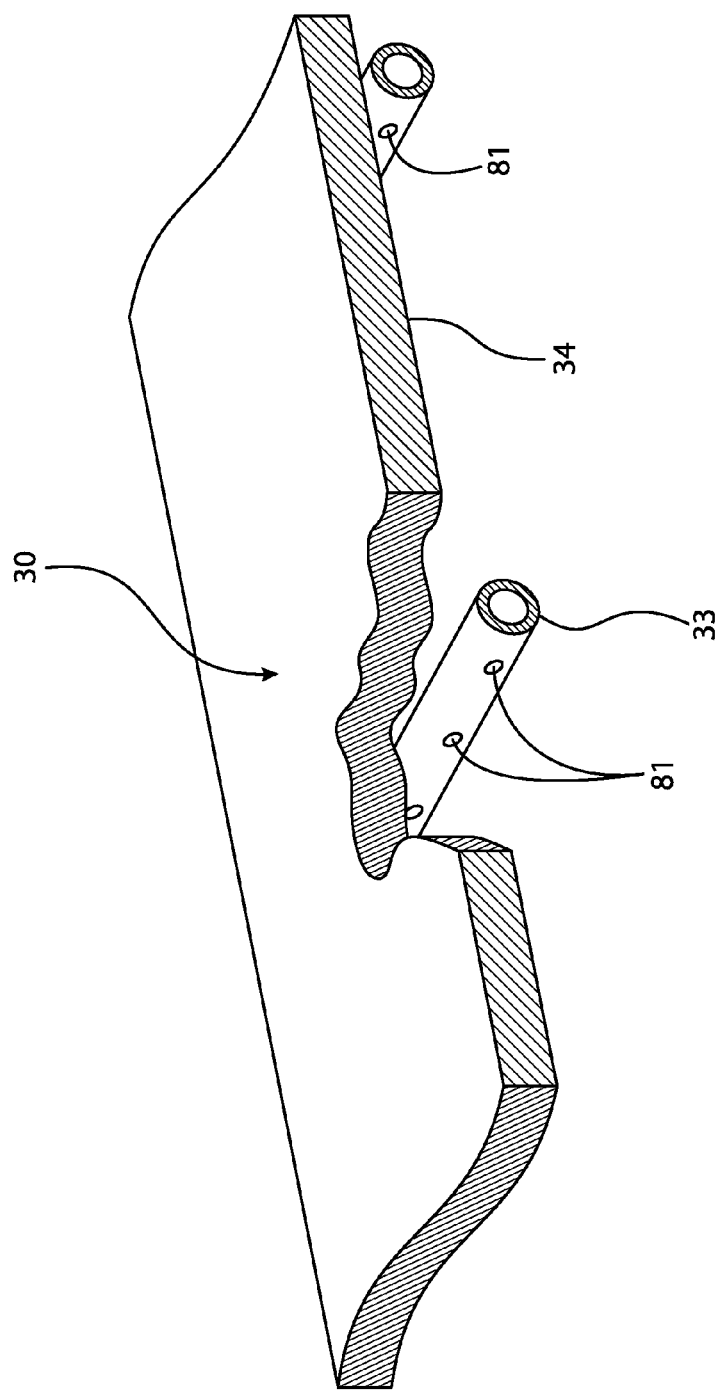
FIG. 1D is a diagrammatical perspective view showing a detail of the hood shown in FIG. 1.

The separation barrier 30 may operate as a hood. As illustrated in FIG. 1D, reductant injectors 81 are provided to inject gaseous reductants under the hood or separation barrier 30 to react with the reducible materials to accelerate the reduction of iron oxide and supplement the reduction potential provided by solid reductants such as coal, coke, coke breeze, or coal char that have been mixed with the iron oxide materials. The reducing gases are injected at a high temperature and then the temperature is increased further to allow fusion and separation of both the iron and slag on the hearth. The process includes preheating and reduction as the temperature is increased from ambient to about 2400° F. (1315° C.), injection of the reducing gases at 2400° F. to 2500° F. (1315° C. to 1371° C.), and final fusion and iron-slag separation.

In one embodiment, the furnace burners 16 are operated at near stoichiometric conditions to produce a furnace atmosphere in the reduction and fusion zones that has a low oxygen content. Under such conditions, the iron oxide is fully reduced to metallic iron as it is brought up to temperatures of about 1400° F. (1315° C.). At this point, the iron oxide is essentially fully reduced as it passes under the separation barrier 30. As it passes under the separation barrier 30, a reducing gas is introduced. This forms a gaseous layer and reduces or prevents the potential for back-oxidation of the metallized charge to FeO. Prevention of FeO formation is important to the process, because, if present, the FeO will react with other slag making components such as alumina, lime or magnesia to form a liquid Fe-rich slag phase. An Fe-rich slag phase will inhibit the partition of sulfur from the iron phase to the slag and produce high sulfur metallic iron. The primary purpose of the reducing gas blanket is to prevent FeO formation.

Carburization of the iron is critical to all of these processes, but has been found to primarily take place at the contact between the agglomerated charge and the underlying carbonaceous hearth layer. The segregation and nucleation of solid iron is observed to take place at the hearth layer contact and progressively incorporate the overlying porous iron while segregating the slag making components. Carbon transfer from the hearth to the iron is essential to produce molten iron and formation of metallic iron. Both CO and CH4 (natural gas) are used in conventional carburization of iron, albeit at lower temperatures than this process for practical reasons. The carburization rates are low, but in this process the temperature is much higher so that the rate may not be insignificant. Further the lace-work of metallized iron formed in the initial reduction stage provides a very large surface area for the reaction so even if the carburization rate is slow it will still be a significant factor in carburization and promote early iron fusion, final coalescence and formation of metallic iron.

Sulfur transfer from the iron to slag is logically most rapid at the contact between the liquid iron and liquid slag. As carburization of the iron proceeds at the hearth layer briquette interface and fusion to form metallic iron proceeds liquid slag migrates out and up into the overlying sponge iron. The path length for de-sulfurization is measured in microns at this stage and if a CaO-rich slag were available de-sulfurization would be quite efficient. Injection of a gaseous reductant is a way to prevent back oxidation of Fe to FeO and maintain the integrity of the slag so that sulfur partition can be effective.

Further, as the slag migrates up through the sponge iron, it makes close contact with the iron. Sulfur transfer from the iron to the slag during this stage should not necessarily be discounted entirely because of the intimate contact and near fusion temperature involved.

The gaseous reductant may be selected from the group consisting of carbon monoxide, hydrogen, combustion gases, synthetic gases, natural gas, or mixtures thereof. Synthetic gases include reducing gases generated from coal, coke, or char by partial oxidation at high temperatures, or by injecting steam or carbon dioxide into a preheated bed of coal, coke, or char.

The reductant injectors may be positioned close to the upper surface of the reducible materials on the moving hearth 20 to provide for efficient reduction of the reducible material. For example the reductant injectors may be placed within 8" (about 200 mm) or 6" (about 150 mm) of the materials on the hearth 20, or may be placed within 2" or 3" (about 50 mm or about 75 mm) of the materials on the hearth 20. In the embodiment shown in FIG. 1D, the reductant injectors 81 may be apertures in the spaced pipes, or hollow beams 33 spaced along the length of the beam as the beam extends from adjacent one side wall of the furnace to adjacent the opposite side wall of the furnace. The apertures may be directed upstream, directed downstream, or directed up or down. The reductant injector may inject the gaseous reductant at any angle. The injection points and direction may be selected to reduce direct impingement on the injected gaseous reductant onto the materials on the hearth 20 and/or to promote mixing of the injected gaseous reductant with the atmosphere below the hood 30.

The injected reductant gases can include carbon monoxide, natural gas, hydrogen, effluent gases or mixtures of any of these gases. Where the furnace temperatures are lower, i.e., below about 2000° F. (1100° C.), carbon monoxide and hydrogen gas are better choices than natural gas.

Where the hood 30 comprises a plurality of spaced pipes or hollow beams 33, the beams may have apertures such that any reductant gases introduced into the beams 33 will flow out of the beams to the area below the hood 30. Depending upon the spacing of the beams 33, every beam may include apertures or only certain beams may include apertures. Conduits, injectors, or other devices may also be provided to effect the injection of reductant gases below the hood 30.

In one particular instance, the hood 30 can be installed towards the feed end of the furnace where the temperatures are relatively low, i.e., 2280° F. (1250° C.). The injection of a gaseous reductant at this point in the process will allow addition of less than stoichiometric amounts of solid reductant in the reducible materials, if desired, and also allows the carryover of some solid carbonaceous material into the fusion zone of the furnace where reduction of the iron oxides is typically completed, and provides carbon to be absorbed by the metallic iron formed, which will reduce the melting point of the metallic iron and facilitate separation of the metallic iron and slag on the hearth.

Preferably, the hood 30 can be installed towards the fusion end of the furnace where the temperatures are about 2450° F. (1343° C.). To provide for control of the flow of fluids in the conversion zone 13, a first baffle 40 is provided between drying/preheat zone 12 and conversion zone 13. This first baffle 40 is capable of inhibiting direct fluid communication between the atmosphere of the conversion zone 13 and the atmosphere of the drying/preheat zone 12. First baffle 40 may be made of a suitable refractory material, such as silicon carbide, and may extend downwardly to within a few inches of the reducible material on the hearth 20. The design is to provide for efficient inhibiting of direct fluid communication between the conversion zone 13 and the drying/preheat zone 12 in the furnace 10, without interfering with movement of reducible material on hearth 20 through furnace housing 11.

A first communication passageway 41 is also provided and capable of carrying fluids from the combustion region 32 of the conversion zone 13 to the drying/preheat zone 12. The first communication passageway 41 may be a chamber or chambers laterally positioned in the side(s) of the furnace housing 11 with a double refractory wall, or ducting which extends through the side(s) of the furnace housing 11 as shown in FIG. 2.

The inlet 42 to first communication passageway 41 may be located to provide for efficient combustion of the fluidized volatile material in combustion region 32, and to efficiently move the combusted fluids from the combustion region 32. As shown in FIG. 2, the flow through first communication passageway 41 may facilitate flow of volatile fluids from the reducing region 31 to the combustion region 32, to provide flow of the fluidized volatile material within the reducing region 31 in the direction of travel of hearth 20 through the furnace housing 11, and to provide for flow of the fluidized volatile material and combusted fluids through the combustion region 32 counter to the direction of travel of the hearth 20 through the furnace housing 11 to facilitate flow from the outlet 43 of the first communication passageway 41.

In the alternatives shown in FIGS. 2 through 8, a process fan 44 may be provided with its inlet 45 adjacent the entrance baffle 19 of the reducible material on the hearth cars 21 into the furnace 10 for efficient use of the transported fluids in the drying/preheat zone 12, and to provide for efficient heat transfer in drying/preheating the reducible material. The outlet 43 of first communication passageway 41 is provided adjacent the first baffle 40, and near the reducible material, to provide for efficient use of the fluid flow from passageway 41 in drying and preheating the reducible material in drying/preheat zone 12. To provide flow of the fluid through drying/preheat zone 12 counter to the movement of the hearth 20 through the furnace housing 11, a generally horizontal baffle 49 may extend from first baffle 40 into the drying/preheat zone 12 to direct flow of the fluid from outlet 43 of first communication passageway 41 through the drying/preheat zone 12, to efficiently transfer heat from the transported fluid to dry and preheat the reducible material on the hearth 20.

The temperature of the combusted fluids through first communication passageway 41 is generally too high for effective use of the drying/preheat zone 12. For this reason, a temperature controller 47 is positioned in first communication passageway 41 and is capable of controlling the temperature of the fluid flowing from the combustion region 32 of the conversion zone 13 to the drying/preheat zone 12. The temperature controller 47 may cool the fluid transported through first communication passageway 41 by mixing with a cooling gas such as tempering air or nitrogen transported from cooling zone 15. Alternatively, the temperature controller 47 may be in the form of a heat exchanger capable of controlling the temperature of the fluid flowing through first communication passageway 41 by extracting and recovering heat from the fluid flow in the first communication passageway 41. The extracted and recovered heat may be transferred to a secondary fluid in the heat exchanger 47 and transferred by a duct 48 to a heater (not shown) capable of heating gas supplied to the burners 16 in the combustion region 32 and the fusion zone 14, or the gas supplied to burners 16 may be heated directly in heat exchanger 47.

A second baffle 50 is provided either between conversion zone 13 and fusion zone 14 or part way into fusion zone 14. Second baffle 50 is capable of inhibiting direct fluid communication between the atmosphere of the part of the fusion zone 14 downstream of the baffle to the atmosphere of the conversion zone 13. The second baffle 50 may be a refractory material, such as silicon carbide, and extend to within a few inches of the reducible material positioned on the hearth 20 as it moves through the furnace housing 11, to effectively inhibit the direct fluid communication across the second baffle 50.

Alternatively or in addition, a second communication passageway 51 may be provided capable of carrying fluid from the fusion zone 14 to the combustion region 32 of the conversion zone 13 adjacent the first baffle 40 as shown in FIG. 2. The inlet 52 to second communication passageway 51 is positioned in fusion zone 14 downstream of second baffle 50 to provide flow of fluid through the fusion zone counter to the travel of the hearth 20 through fusion zone 14. This provides for efficient transfer of the heat in reducing and melting of the metallic iron material in the fusion zone 14. For this purpose, a horizontal baffle 53 of refractory material may extend from second baffle 50 downstream into the fusion zone 14 to facilitate the counter current flow of fluid through the fusion zone and avoid turbulence in the vicinity of the reducible material as it passes under second baffle 50. The outlets 54 from second communication passageway 51 into the combustion region 32 of conversion zone 13 may be distributed as shown in FIG. 1 for more effective transfer of heat from the fluids transported from the fusion zone 14 to the combustion region 32 for their efficient use in combusting fluidized volatile material and produce heat assist in reducing the reducible material in the reducing region 31.

The cooling zone 15 within the furnace housing 11 is optional, since it may be desired in certain embodiments to perform the cooling of the metallic iron material outside the furnace housing 11 to reduce furnace costs and other considerations. Alternatively, a third baffle 60 may be provided between the fusion zone 14 and the cooling zone 15. Third baffle 60 is capable of inhibiting direct fluid communication between the atmosphere of at least part of the cooling zone 15 and the atmosphere of the fusion zone 14. The third baffle 60 may be made of a refractory material, such as silicon carbide, and may extend to within a few inches of the reducible material positioned on the hearth 20 as reducible material moves through the furnace housing 11. The third baffle 60 together with third communication passageway 61 provides for efficient movement of fluid through the atmosphere of cooling zone 15 counter to the direction of travel of the hearth 20, through the furnace housing, and to extract heat from the metallic iron material in the cooling zone 15 for use in the drying/preheat zone 12 to dry and preheat the reducible material. Third communication passageway 61 is positioned downstream adjacent third baffle 60, with inlet 62 positioned adjacent third baffle 60, and a horizontal baffle 63 may extend from third baffle 60 to efficiently direct the flow of fluid through the cooling zone 15. The outlet 64 from the third communication passageway 61 is adjacent the first baffle 40. Alternatively, if desired, all or part of the fluid flow through the third communication passageway 61 may be directed to temperature controller 47 in first communication passageway 41 and mixed with a fluid flow through communication passageway 41 to lower and control the temperature of that fluid flow.

Both second communication passageway 51 and third communication passageway 61 may be provided in lateral chambers as part of the furnace housing 11 or by separate ducting through the roof 17 or side walls 18 of furnace housing 11. In either case, these communication passageways should be insulated so as to minimize the loss of heat and to provide for efficient transfer of heat from one part of the furnace 10 to another, and in turn increase the efficiency of the furnace 10 in reducing the iron oxide to metallic iron (while efficiently combusting volatiles from the reducible material to heat the reducible material in the conversion zone 13).

FIG. 1 shows a preferred placement of hood 30. Hood 30 extends from adjacent second baffle 60 through the fusion zone 14 towards second baffle 50. Hood 30 may extend throughout the entire fusion zone 14 or beyond, may extend over only a portion of fusion zone 14, may extend from the end of the fusion zone 14 towards second baffle 50, or may cover a latter portion of fusion zone 14 The hood 30 may be positioned within 8" (about 200 mm) or 6" (about 150 mm) of the materials on the hearth 20, or may be placed within 2" or 3" (about 50 mm or about 75 mm) of the materials on the hearth 20. In any of these configurations, depending on expected furnace conditions, reductant gases may be injected under the entire hood 30 or only under selected portions of hood 30. Provisions may be made in the baffles, or by providing gas conduits, to allow gases to flow between various portions of the furnace as needed for control of pressure, flow of exhaust gases, etc.

Figure 4:
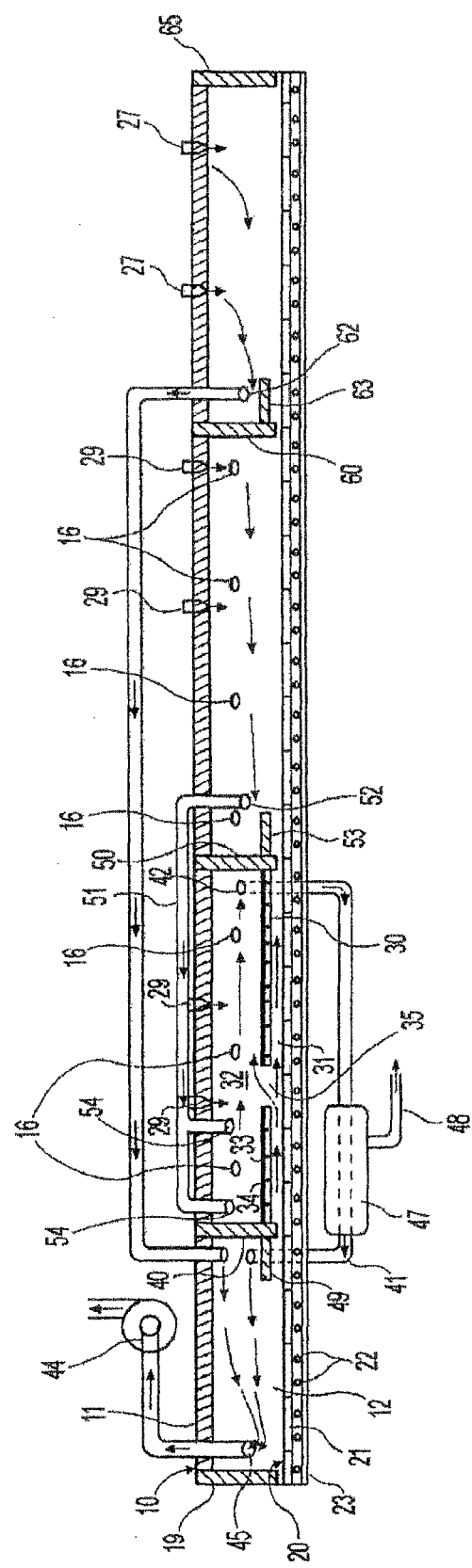
FIG. 4 is an elevation view illustrating a further alternative embodiment of a hearth furnace for producing metallic iron material, and method for operating the same.

FIG. 4 illustrates an alternative embodiment of the moving hearth furnace 10 with the same components as described above with reference to FIGS. 2 and 3, except the separation barrier 30 extends to second baffle 50 so there is no gap 36 at the end of the separation barrier 30. In this embodiment, inlet 42 to first communication passageway 41 is located in the combustion region 32 adjacent the second baffle 50 for efficient removal of the combusted volatiles from the combustion region 32. Flow of fluidized volatile material through the forepart of reducing region 31, through intermediate gap 35, and through the latter part of the combustion region 32 is in a "S" shape. The volatiles fluidized in the reducing region 31 downstream of intermediate gap 35 may, depending on the pressure drops, either flow countercurrent the direction of movement of the hearth 20 through the reducing region 31 and through the intermediate gap 35, or under the second baffle 50 where the fluidized volatile material are collected through inlet 52 of the second communication passageway 51 along with the other volatile from fusion zone 14 and circulated through second passageway 51 to the combustion region 32 adjacent the first baffle 40. There these fluidized volatile material are combusted in the combustion region 32 along with the other fluidized volatile material transported though the intermediate gap 35 from the reducing region 31.

Figure 5:
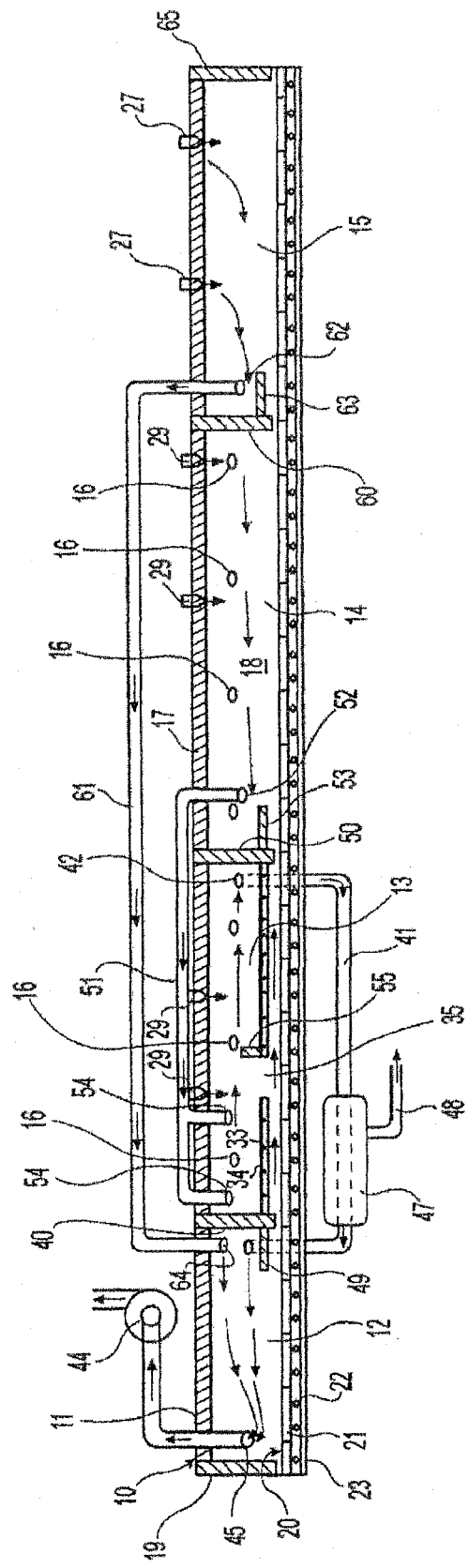
FIG. 5 is an elevation view illustrating a further alternative embodiment of a hearth furnace for producing metallic iron material, and method for operation for the same.

As an additional feature, as shown in FIG. 5, weir 55 may be positioned contiguous with the separation barrier 30 adjacent intermediate gap 35. Weir 55 inhibits direct flow of fluidized volatile materials from the reducing region 31 through intermediate gap 35 into the combustion region 32 adjacent second baffle 50, while allowing these fluidized volatile material to flow over weir 55 into that area of the combustion region 32. This embodiment provides for increased mixing of fluidized volatile material in the combustion region 32 adjacent the second baffle 50 for more efficient combustion of these volatiles, and in turn transfer of increased heat of combustion to more efficiently reduce the iron-oxide bearing material in the reducing region 31 downstream of gap 35.

FIGS. 6, 7 and 8 illustrate alternative embodiments of the furnace 10 with the same components as described above with reference to FIGS. 2 and 3, except for the arrangement of the separation barrier 30 and elimination or modification of the second baffle 50 between the conversion zone 13 and the fusion zone 14. In the embodiment shown in FIGS. 6, 7 and 8, the separation barrier 30 is positioned spaced from first baffle 40 by space 70 between first baffle 40 and separation barrier 30, where volatilizable materials associated with the reducible materials are more likely to fluidize in the conversion zone.

In the embodiment shown in FIG. 6, a first weir 71 is positioned contiguous with the separation barrier 30 so that it is capable of inhibiting direct fluid communication between the atmosphere of the conversion zone 13 not covered by the separation barrier 30, at 70, and the atmosphere of the combustion region 32 adjacent at least the portion of the separation barrier 30, while allowing fluidized volatile materials to flow over the first weir 71. The volatilizable material on the hearth 20 is more likely to already be fluidized in area 70 before the hearth moves under separation barrier 30. In addition, a second weir 72 is positioned contiguous with the separation barrier 30 and capable of inhibiting direct fluid communication between the atmosphere of the fusion zone 14, not covered by the separation barrier 30, and the atmosphere of the combustion region 32 adjacent at least a portion of the separation barrier 30, while allowing fluid to flow over the second weir 72 from the fusion zone 14 into the combustion region 32. The inlet 42 to the first communication passageway 41 is positioned in the side wall 18 of the furnace housing 11, preferably in the form of a plenum to carry fluid from the atmosphere of combustion region 32 of the conversion zone 13 between first and second weirs 71 and 72 to the atmosphere of the drying/preheat zone adjacent first baffle 40 as shown in FIG. 5. To facilitate the flow of fluid countercurrent to the direction of movement of the reducible material on hearth 20 in the fusion zone 14, second weir 72 may be offset from the end of the separation barrier 30 as shown by 53 in FIG. 6.

In an alternative to the embodiment discussed above shown in FIG. 8, the second weir 72 is replaced by a second baffle 80 that extends from the roof of the furnace housing 11 to the separation barrier 30 as shown in FIG. 8. In this embodiment, the inlet 42 to the first communication passageway 41 is positioned through the side of the furnace housing 11, for more efficient burning of the transported fluidized volatile materials from the reducible material in the conversion zone 13 at 70, where the separation barrier 30 is not positioned over the hearth 20.

In another alternative embodiment shown in FIG. 7, weirs 71 and 72 have extensions 74 and 75 extending toward each other to form a partially enclosed volume 76 of a portion of the combustion region 32 above separation barrier 30 into which fluidized volatile material can flow from space 70 of the conversion zone 13 and fluid from the fusion zone 14 can flow through opening 77. In this embodiment, the burners 16 for combusting the transported fluids in the combustion region 32 are located adjacent the opening 77, either in roof 17 or side walls 18 of furnace housing 11, and the inlets 42 into first communication passageway 41 are positioned in the sides of the furnace housing 11 within the partially enclosed volume 76. In this embodiment, inlets 42 are provided in the enclosed volume 76 spaced from the opening 77 for efficient combustion of fluidized volatile material in combustion region 32, for heating the reducible material in reducing region 31, and efficient transport of the combusted fluids from the combustion region 32 to the drying/preheat zone 12.

Figure 9:
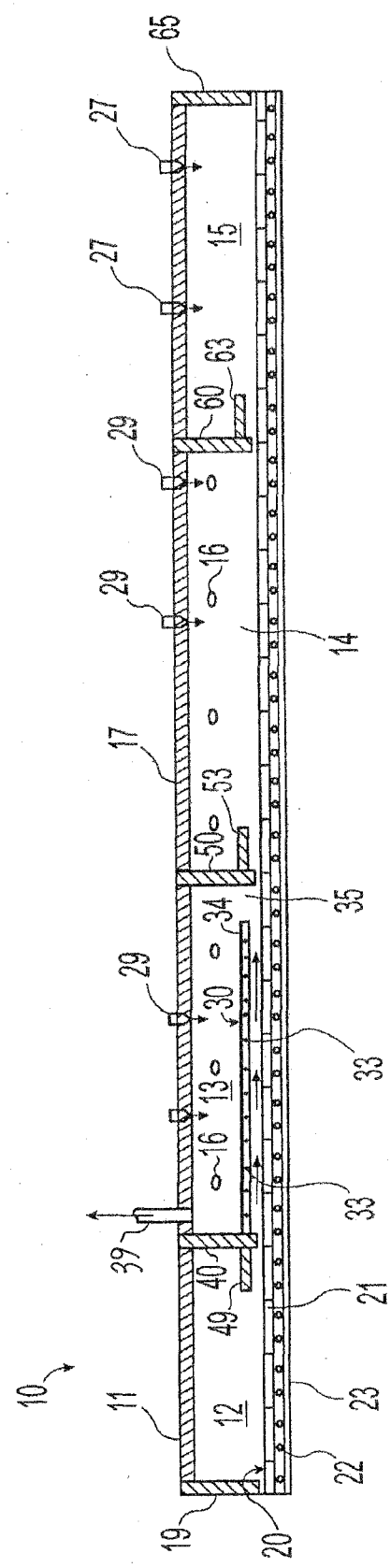
FIG. 9 is an elevation view illustrating a further alternative embodiment of a hearth furnace for producing metallic iron material, and method for operation for the same.

FIG. 9 shows the separation barrier 30 extending from adjacent the first baffle 40 through the conversion zone 13 towards second baffle 50. One or more gaps 35 may be formed in separation barrier 30, as needed, to facilitate the flow of gases through furnace 10 such as shown in FIG. 2. separation barrier 30 may extend throughout the entire conversion zone 13 or beyond, may extend over only a portion of conversion zone 13, may extend from the beginning of the conversion zone 13 towards second baffle 50 with a gap 35 between separation barrier 30 and second baffle 50, or may cover a latter portion of conversion zone 13 with a gap 35 between first baffle 40 and separation barrier 30. Second baffle 50 may also be placed within the fusion zone 14, such that separation barrier 30 extends from a beginning location in conversion zone 13 to an ending location in fusion zone 14. The separation barrier 30 may be positioned within 8" (about 200 mm) or 6" (about 150 mm) of the materials on the hearth 20, or may be placed within 2" or 3" (about 50 mm or about 75 mm) of the materials on the hearth 20. In any of these configurations, depending on expected furnace conditions, reductant gases may be injected under the entire separation barrier 30 or only under selected portions of separation barrier 30. Provisions may be made in the baffles, or by providing gas conduits, to allow gases to flow between various portions of the furnace as needed for control of pressure, flow of exhaust gases, etc.

Figure 10:
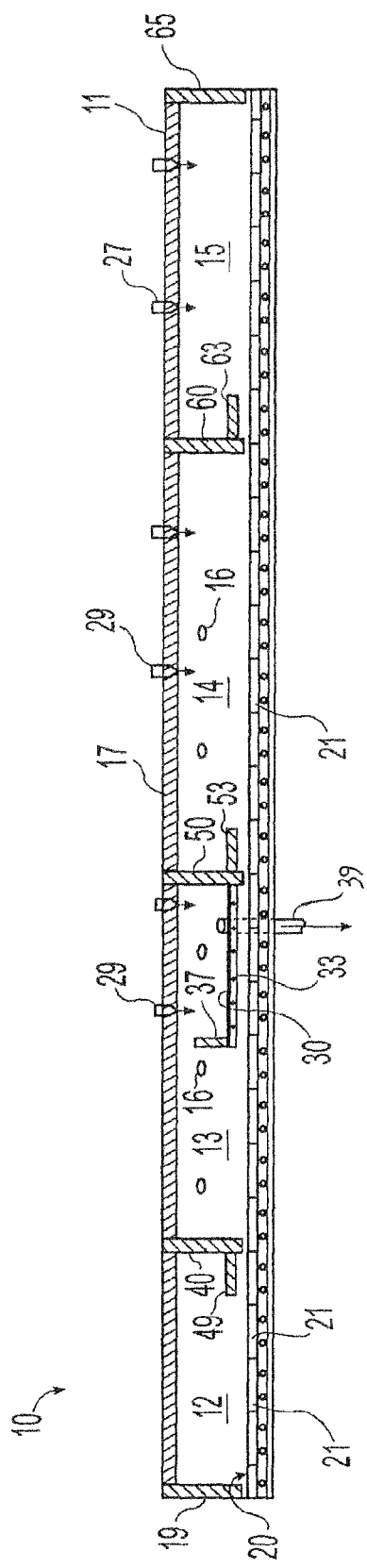
FIG. 10 is an elevation view illustrating a further alternative embodiment of a hearth furnace for producing metallic iron material, and method for operation for the same.

FIG. 10 shows an alternate embodiment of separation barrier 30. The separation barrier 30 extends from a location partway through the conversion zone 13 to second baffle 50. In this alternate embodiment, second baffle 50 can be located at the boundary between conversion zone 13 and the fusion zone 14. Second baffle 50 may also be placed within the fusion zone 14, such that separation barrier 30 extends from a beginning location in conversion zone 13 to an ending location in fusion zone 14. A weir wall 37 may be provided at an upstream end of separation barrier 30. The exhaust conduit 41 may be positioned within the space defined by separation barrier 30, weir wall 37 and second baffle 50. In this alternate embodiment, oxygen lances 29 in the conversion zone 13 might only be provided in the space above separation barrier 30. The separation barrier 30, along with the point of reductant gas injection, may be positioned based upon expected reducible material temperatures to make advantageous use of the injected reductant gases. In this embodiment, separation barrier 30 may, for example, be positioned within 8" (about 200 mm) or 6" (about 150 mm) of the materials on the hearth 20, or may be placed within 2" or 3" (about 50 mm or about 75 mm) of the materials on the hearth 20.

The position of the separation barrier 30 in FIG. 10 illustrates an estimated position where the reducible material has been heated sufficiently in the first part of the conversion zone 13 to bring the reducible material on the hearth 20 up to nearly 2100° F. (1150° C.) before it passes under the separation barrier 30. Injection of the reductant gas under the separation barrier 30 after this point may provide the highly reducing atmosphere needed to produce metallic iron at a temperature low enough to inhibit reaction of the FeO formed with a siliceous gangue material.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A hearth furnace for producing metallic iron material comprising:
a furnace housing having a drying/preheat zone capable of providing a drying/preheat atmosphere for reducible material, a conversion zone capable of providing a reducing atmosphere for reducible material, a fusion zone capable of providing an atmosphere to at least partially reduce metallic iron material, and optionally a cooling zone capable of providing a cooling atmosphere for reduced material containing metallic iron material, the conversion zone being positioned between the drying/preheat zone and the fusion zone,
a hearth capable of being movable within the furnace housing in a direction through the drying/preheat zone, then the conversion zone, then the fusion zone, and then, if present, the cooling zone,
a hood positioned within at least a portion of the conversion zone, fusion zone or both, separating said zones where the hood is positioned into an upper region and a lower region with the lower region adjacent the hearth and the upper region adjacent the lower region and spaced from the hearth, and
at least one injector capable of introducing a gaseous reductant into the lower region adjacent the hearth.

2. The hearth furnace for producing metallic iron material as claimed in claim 1 where the hood is positioned in the fusion zone.

3. The hearth furnace for producing metallic iron material as claimed in claim 1 where the hood is positioned in the conversion zone.

4. The hearth furnace for producing metallic iron material as claimed in claim 1 where the hood is positioned partly in the conversion zone and partly in the fusion zone.

5. The hearth furnace for producing metallic iron material as claimed in claim 1 where above the hood a combustion region is formed in at least a portion of the conversion zone and fusion zone.

6. The hearth furnace for producing metallic iron material as claimed in claim 1 where gaseous reductant is selected from the group consisting of carbon monoxide, hydrogen, natural gas, syn-gas, and mixtures thereof.

7. The hearth furnace for producing metallic iron material as claimed in claim 1 where the hood comprises a plurality of hollow beams.

8. The hearth furnace for producing metallic iron material as claimed in claim 1 where the injector is positioned about 6" (150 mm) from reducible material on the hearth.

9. The hearth furnace for producing metallic iron material as claimed in claim 1 where the injector is positioned about 3" (75 mm) from reducible material on the hearth.

10. The hearth furnace for producing metallic iron material as claimed in claim 1 further comprising:
a first baffle capable of inhibiting direct fluid communication between the atmosphere of the conversion zone and the atmosphere of the drying/preheat zone, and
a second baffle capable of inhibiting direct fluid communication between the atmosphere of at least part of the fusion zone and the atmosphere of the conversion zone.

11. The hearth furnace for producing metallic iron material as claimed in claim 10 where the second baffle is positioned in the fusion zone so that the atmosphere of a part of the fusion zone is in direct communication with the conversion zone.

12. The hearth furnace for producing metallic iron material as claimed in claim 1 where the hood is positioned within a region of the fusion zone where the temperature exceeds 2350° F. (1287° C.).

13. The hearth furnace for producing metallic iron material as claimed in claim 1 where the hood is positioned within a region of the fusion zone where the temperature exceeds 2450° F. (1343° C.).

14. The hearth furnace for producing metallic iron material as claimed in claim 1 where the hood extends from an end of the fusion zone distal the conversion zone and at least partway towards the conversion zone.

15. A hearth furnace for producing metallic iron material comprising:
a furnace housing having a drying/preheat zone capable of providing a drying/preheat atmosphere for reducible material, a conversion zone capable of providing a reducing atmosphere for reducible material, a fusion zone capable of providing an atmosphere to at least partially reduce metallic iron material, and optionally a cooling zone capable of providing a cooling atmosphere for reduced material containing metallic iron material, the conversion zone being positioned between the drying/preheat zone and the fusion zone,
a hearth capable of being movable within the furnace housing in a direction through the drying/preheat zone, then the conversion zone, then the fusion zone, and then, if present, the cooling zone,
a separation barrier within at least a portion of the conversion zone, the fusion zone or both, the separation barrier separating the furnace housing where the separation barrier is located into a combustion region and a reducing region with the reducing region adjacent the hearth and the combustion region adjacent the reducing region and spaced from the hearth, and
at least one injector capable of introducing a gaseous reductant into the reducing region.

16. The hearth furnace for producing metallic iron material as claimed in claim 15 where the gaseous reductant is selected from the group consisting of carbon monoxide, hydrogen, natural gas, syn-gas, and mixtures thereof.

17. The hearth furnace for producing metallic iron material as claimed in claim 15 where the separation barrier comprises a plurality of hollow beams.

18. The hearth furnace for producing metallic iron material as claimed in claim 17 where the injector comprises at least one of the hollow beams having holes therein.

19. The hearth furnace for producing metallic iron material as claimed in claim 15 where the injector is positioned about 6" (150 mm) from reducible material on the hearth.

20. The hearth furnace for producing metallic iron material as claimed in claim 15 where the injector is positioned about 3" (75 mm) from reducible material on the hearth.

21. The hearth furnace for producing metallic iron material as claimed in claim 15 where the separation barrier ascends upwardly in the direction of movement of the hearth.

22. The hearth furnace for producing metallic iron material as claimed in claim 15 where the separation barrier is comprised of a gas curtain.

23. The hearth furnace for producing metallic iron material as claimed in claim 22 where the gas curtain is comprised of a gas selected from the group consisting of nitrogen, carbon monoxide, combustion gas, effluent gas from the furnace, and a mixture of two or more of these gases.

24. The hearth furnace for producing metallic iron material as claimed in claim 22 where the gas curtain is formed by a lateral flow of gas transverse the direction of travel of the moveable hearth through the furnace.

25. The hearth furnace for producing metallic iron material as claimed in claim 22 where the gas curtain is formed by an angled upward flow of gas from opposite sides of the furnace.

26. The hearth furnace for producing metallic iron material as claimed in claim 22 where the gas curtain is formed by flow from oxy-fuel burners.

27. The hearth furnace for producing metallic iron material as claimed in claim 15 further comprising:
- a first baffle capable of inhibiting direct fluid communication from the atmosphere of the conversion zone to the atmosphere of the drying/preheat zone, and
- a second baffle capable of inhibiting direct fluid communication from the atmosphere of at least part of the fusion zone to the atmosphere of the conversion zone.

28. The hearth furnace for producing metallic iron material as claimed in claim 27 further comprising:
- a first communication passageway capable of carrying fluid from the atmosphere of the combustion region of the conversion zone to the atmosphere of the drying/preheat zone adjacent the first baffle, and
- a second communication passageway capable of carrying fluid from the atmosphere of the fusion zone downstream of the second baffle to the atmosphere of the combustion region of the conversion zone adjacent the first baffle.

29. The hearth furnace for producing metallic iron material as claimed in claim 28 further comprising:
- a third communication passageway capable of carrying fluid from the atmosphere of the cooling zone adjacent the third baffle to the atmosphere of the drying/preheat zone adjacent the first baffle.

30. The hearth furnace for producing metallic iron material as claimed in claim 28 further comprising:
- a temperature controller positioned in the first communication passageway capable of controlling the temperature of fluid flowing from the atmosphere of the combustion region of the conversion zone to the drying/preheat zone.

31. The hearth furnace for producing metallic iron material as claimed in claim 28 further comprising:
- a heat exchanger positioned in the first communication passageway capable of controlling the temperature of fluid flowing from the atmosphere of the combustion region of the conversion zone to the atmosphere of the drying/preheat zone and capable of recovering heat from the fluid flow in the first communication passageway.

32. The hearth furnace for producing metallic iron material as claimed in claim 31 further comprising:
- a heater capable of heating gas supplied to burners combusting the fluid in the combustion region of the conversion zone or the fusion zone using in part the heat recovered by the heat exchanger.

33. The hearth furnace for producing metallic iron material as claimed in claim 27 where the second baffle is positioned in the fusion zone so that the atmosphere of a part of the fusion zone is in direct communication with the conversion zone.

34. The hearth furnace for producing metallic iron material as claimed in claim 27 where the separation barrier extends to the second baffle.

35. The hearth furnace for producing metallic iron material as claimed in claim 15 where the separation barrier has at least one gap or is at least partially perforated to enable fluid flow between the reducing region and the combustion region.

36. The hearth furnace for producing metallic iron material as claimed in claim 15 further comprising: a communicating passageway capable of carrying fluid from the atmosphere of the fusion zone to the atmosphere of the reducing region of the conversion zone.

* * * * *